United States Patent
Ueno et al.

[11] Patent Number: 5,811,903
[45] Date of Patent: Sep. 22, 1998

[54] MOTOR

[75] Inventors: Toshio Ueno; Fujio Iwashita; Toshio Yamamoto; Shigeru Ozawa, all of Nagano, Japan

[73] Assignee: Sankyo Seiki Mfg. Co., Ltd., Nagano-ken, Japan

[21] Appl. No.: 718,953

[22] Filed: Sep. 26, 1996

[30] Foreign Application Priority Data

Sep. 26, 1995 [JP] Japan .................................. 7-271854

[51] Int. Cl.[6] ............................................. H02K 5/16
[52] U.S. Cl. .................. 310/90; 310/40 MM; 310/49 R; 310/51; 384/565; 384/619
[58] Field of Search ................................. 310/90, 49 R, 310/40 MM, 51; 384/610, 611, 420, 424, 425, 243, 563, 592, 603, 223, 282, 228, 275, 590, 565, 619, 620

[56] References Cited

U.S. PATENT DOCUMENTS

| 5,209,055 | 5/1993 | Hini et al. ................................. 57/406 |
| 5,497,039 | 3/1996 | Blaettner et al. ........................ 310/51 |
| 5,567,998 | 10/1996 | Ineson et al. ........................... 310/90 |

FOREIGN PATENT DOCUMENTS

| 173947 | 7/1987 | Japan ....................................... 310/90 |
| 6-21383 | 3/1994 | Japan ....................................... 310/90 |
| 6-62541 | 3/1994 | Japan ....................................... 310/90 |
| 133490 | 5/1994 | Japan ................................... 310/49 R |
| 7-75322 | 3/1995 | Japan ....................................... 310/90 |

*Primary Examiner*—Clayton E. LaBalle
*Assistant Examiner*—K. Imayoshi E. Tamai
*Attorney, Agent, or Firm*—McAulay Nissen Goldberg Kiel & Hand, LLP

[57] ABSTRACT

A motor comprises a motor rotation shaft, a first thrust bearing which supports one end of the motor rotation shaft and a second thrust bearing which supports the other end of the motor rotation shaft to control positioning in a thrust direction of the motor rotation shaft. The first thrust bearing further comprises a bearing for supporting one end of the motor rotation shaft and is movable in a shaft direction of the motor rotation shaft, a guide member for guiding the movement of the bearing in the shaft direction and a plurality of pre-loaded elements for opposing the force generated by the bearing in the shaft direction. The pre-loaded elements are evenly spaced around the motor shaft.

13 Claims, 11 Drawing Sheets

PRIOR ART

MOTOR

BACKGROUND OF THE INVENTION a) Field of the Invention

This invention relates to a motor whose rotating shaft is formed by a lead screw unit.

b) Description of the Related Art

Figure 17:
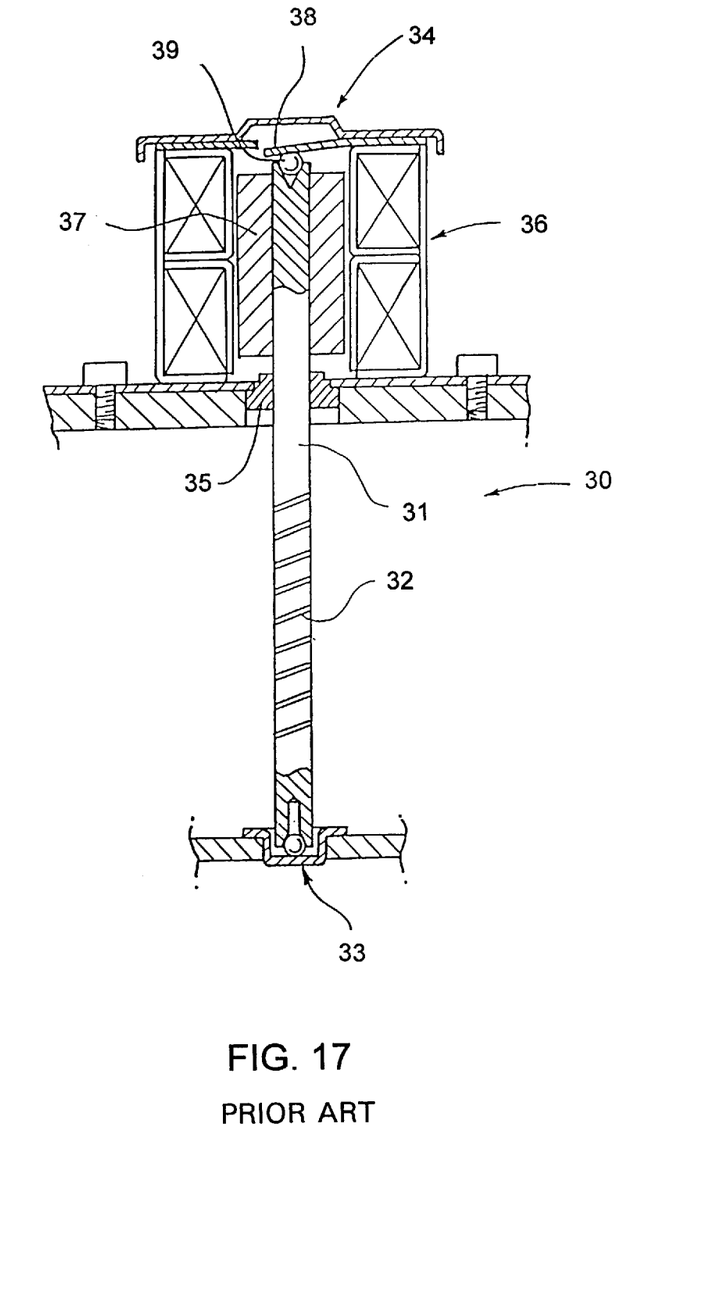
FIG. 17 is a diagram illustrating a conventional stepping motor used in general.

Conventionally, as illustrated in FIG. 17, a stepping motor 30 in which a lead screw unit 32 is formed on a motor rotation shaft 31 is structurally supported by a thrust bearing 33 and 34 at both ends of the motor rotation shaft 31. A metallic bearing 35 is formed near the thrust bearing 34 to support the motor rotation shaft 31 in the motor in the radial direction. A rotor magnet 37 is attached on the side of the motor rotation shaft 31 such that the magnet 37 faces a stator unit 36 at a predetermined distance. The thrust bearing 34 comprises a plate spring 38 and a ball 39 and movably bears the load of the motor rotation shaft 31 in the thrust direction by means of the spring pressure coming from the plate spring 38.

Figure 18:
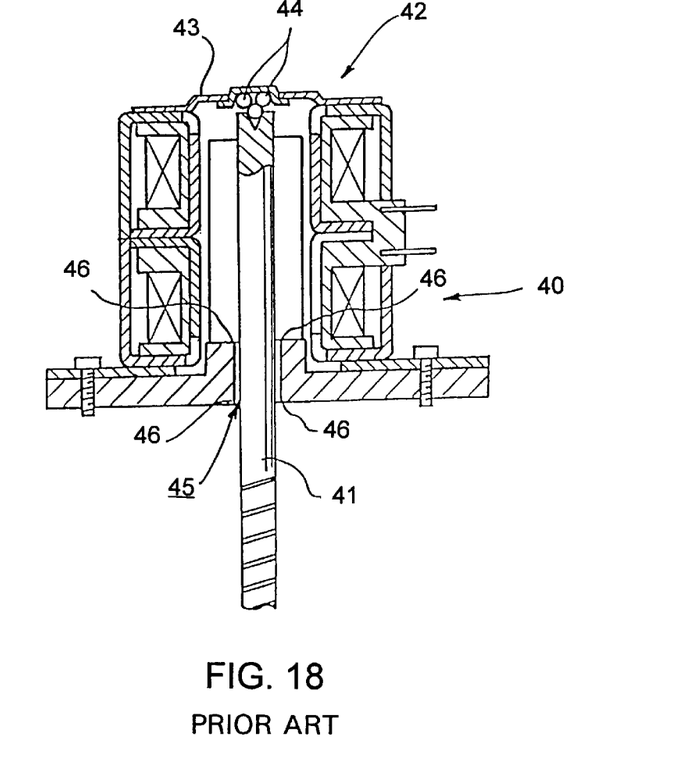
FIG. 18 is a schematic of another conventional stepping motor.
Figure 19:
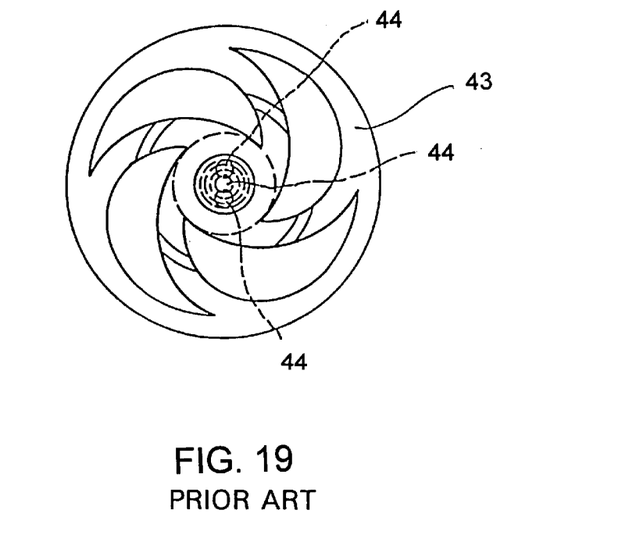
FIG. 19 is a diagram which illustrates a pre-loading spring used in the stepping motor of FIG. 18.

A stepping motor 40 illustrated in FIG. 18 shows another conventional embodiment disclosed in the Utility Model laid open 6-21383.

The stepping motor 40 eliminated the metallic bearing 35 in the mid section as illustrated in FIG. 17, and at both ends of the motor rotation shaft 41 in the motor are supported by two thrust bearings, that is, a bearing 42 on the side of the stator unit and the bearing (not illustrated) on the top. The bearing 42 on the side of the stator unit is constructed with the plate spring 43 for pre-loading and ball bearings comprising a plurality of balls 44.

In the stepping motor illustrated in FIG. 17, the motor rotation shaft 31 contacts the metallic bearing 35 and generates a rattling noise due to the resistance of the object to be fed which is engaged with the lead screw unit 32.

Describing this further, the feeding directions for the object to be fed varies and the magnitude of the resistance varies. As a result, the fluctuation makes the motor 30 susceptible to rattle. Occurrence of rattling also can be a cause of sliding loss in the area of the metallic bearing 35. In addition, the metallic bearing 35 itself is the cause for reducing the rotational force for the motor rotation shaft 31 in the motor because of its slide support function.

On the other hand, the stepping motor 40, as illustrated in FIG. 18, eliminates the metallic bearing 35 supporting in the radial direction but has the plate spring 43 for pre-loading in a complex shape having a plurality of spiral arms.

Also, the plate spring 43 for pre-loading not only bears movement in the thrust direction of the motor rotation shaft 41 in the motor but also bears movement in the radial direction, therefore, it is difficult to set a spring coefficient. In other words, if the spring is tightened strongly for reducing the movement in the radial direction, the load added to the motor rotation shaft 41 in the motor increases, reducing the rotational force. If, however, the spring is loosened for reducing the load in the thrust direction, the spring warps so much that the motor rotation shaft 41 in the motor is displaced from the bearing 42 or it contacts the peripheral corner 46 of the through hole 45 which the motor rotation shaft 41 goes through.

OBJECT AND SUMMARY OF THE INVENTION

The primary object of the invention is to provide a stepping motor having a counter measure for rattling caused by the sliding loss which the motor rotation shaft encounters in the motor or the motor rotation shaft itself.

In accordance with the invention, a motor comprises a motor rotation shaft, a first thrust bearing which supports one end of the motor rotation shaft and a second thrust bearing which supports the other end of the motor rotation shaft to control positioning in a thrust direction of the motor rotation shaft. The first thrust bearing further comprises a bearing for supporting one end of the motor rotation shaft and is movable in a shaft direction of the motor rotation shaft, a guide member for guiding the movement of the bearing in the shaft direction and a plurality of pre-loaded elements for opposing the force generated by the bearing in the shaft direction. The pre-loaded elements are evenly spaced around the motor shaft.

DESCRIPTION OF THE PREFERRED EMBODIMENTS

The first embodiment of this invention is described referring to FIGS. 1 to 8 below.

Figure 1:
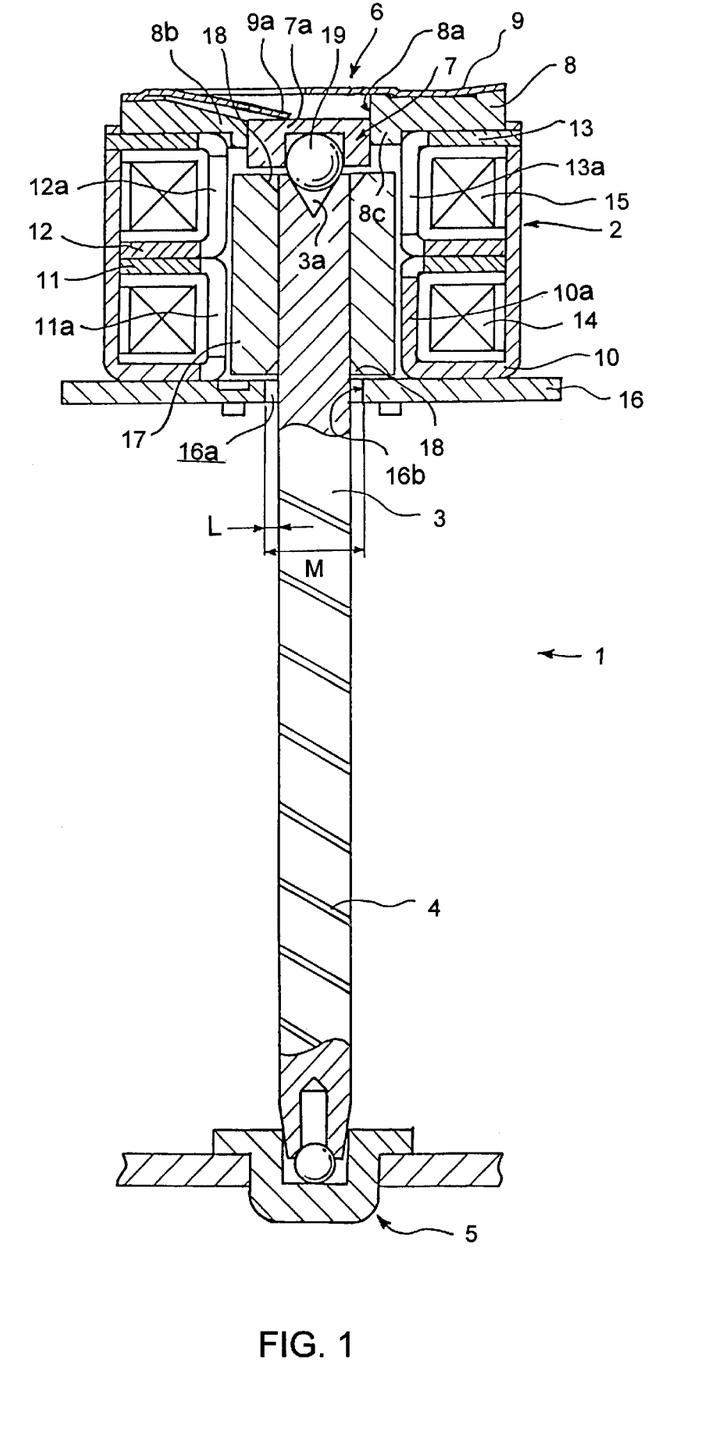
FIG. 1 is a cross section of the major section of the first embodiment.

A stepping motor 1 has, as illustrated in FIG. 1, a motor rotation shaft 3 projecting from a stator unit 2. The motor rotation shaft 3 in the motor is formed with a lead screw 4 of prior art and has the function that it moves an object to be fed (not illustrated) which is engaged with the lead screw in the thrust direction as it rotates. The direction of a motion is controlled by switching the rotational direction for the motor rotation shaft 3.

The stator unit 2 comprises a first stator 10 which also is a motor housing, a second stator 11 having a fine tooth 11a which is alternately engaged with the fine tooth 10a of the first stator 10, a third stator 12 which is back to back the second stator 11, a fourth stator 13 having a fine tooth 13a which is alternately engaged with the fine tooth 12a of the third stator 12, a coil 14 having an annular bobbin for inserting it between the first stator 10 and the second stator 11, and a coil 15 having an annular bobbin for inserting it between the third stator 12 and the fourth stator 13.

Details are not described herein because this configuration is the same as that of the stepping motor of the prior art.

A mounting plate 16 for installing various equipment is attached to the stator unit 2; a through hole 16a is formed in the center of the mounting plate and the motor rotation shaft 3 is inserted therein.

The gap L between the outer surface of the motor rotation shaft 3 and the inner peripherals 16b of the through hole 16a is set to be larger than the coaxiality error between the thrust bearing 6 and the motor rotation shaft 3.

To the motor rotation shaft 3 in the motor, a cylindrical rotor magnet 17 is attached and the diameter M of the through hole 16a is configured to be smaller than the diameter of the rotor magnet 17. Tapered concavities 18 and 18 are formed at both ends of the rotor magnet 17 on the side contacting the motor rotation shaft 3.

Dust may migrate into the stator unit 2 via the gap L and fill the concavity 18 on the side of the through hole 16a, thus the magnetic gap, by which the rotor magnet 17 and the stator unit 2 face each other, prevents dust from proceeding further into the motor.

Both ends of the motor rotation shaft 3 are supported by first and second thrust bearings 6 and 5. The second thrust bearing 5, formed at the bottom of FIG. 1, is configured the same as the conventional thrust bearing illustrated in FIG. 17, therefore, is not described herein.

The first thrust bearing 6 comprises a ball 19, a bearing 7 which supports the ball 19, a guide plate 8 which allows and guides the movement of the bearing 7 in the shaft direction, and a plate 9 which works via a spring to oppose the force generated by bearing 7 in the thrust direction. The ball 19 contacts a conic concave 3a formed on top of the motor rotation shaft 3.

The contact surface between the ball 19 and the conic concave 3a is in a curved shape. In addition, lubricant oil is applied on the contact surface between the ball 19 and the conic concave 3a to reduce friction resistance.

Figure 2:
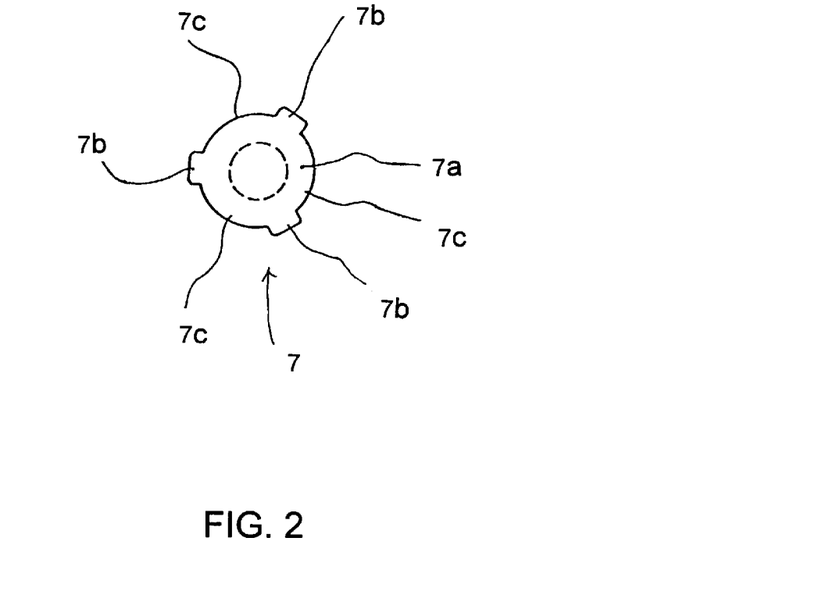
FIG. 2 is a plan view of the ball holding unit used in the first embodiment.

The bearing 7 comprises, as illustrated in FIGS. 1 and 2, a ball holding unit 7a which houses the ball 19, three rotation guard units 7b projected in the radial direction and spaced evenly for preventing the bearing 7 from rotating, and three circular joints 7c with which connect the rotation guard units 7b.

Figure 3:
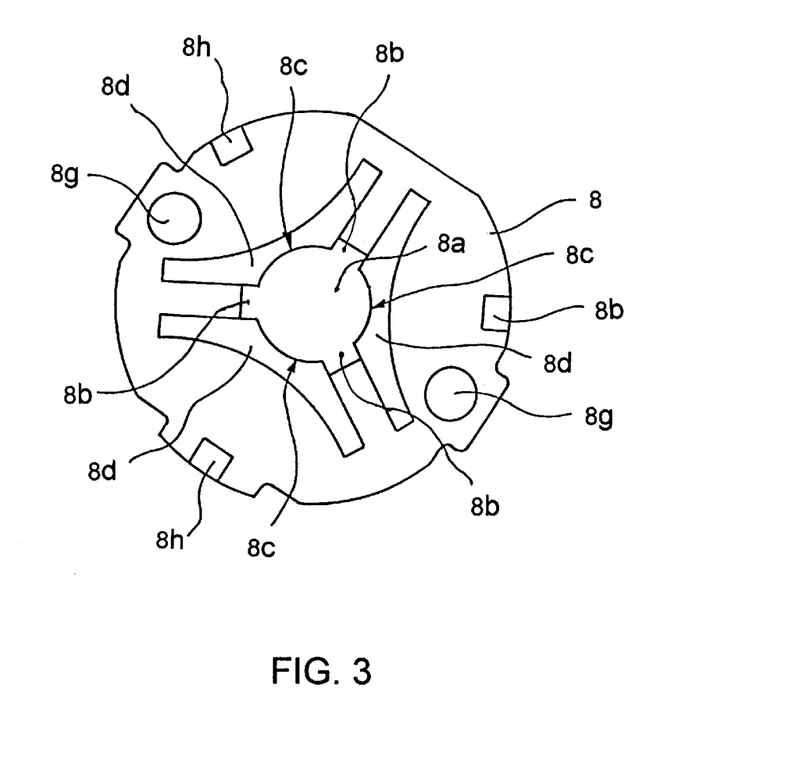
FIG. 3 is a plan view of the guide plate used in the first embodiment.

A guide plate 8, which is a guide member, is molded as a circular plate, as illustrated in FIGS. 1 and 3, wherein a guide hole 8a formed in its center allows the bearing 7 to move in the shaft direction, and at the same time, guides the movement. The guide plate 8 is constructed with grooves 8b and guide units 8c, wherein the grooves 8b are spaced evenly at three places so that the rotation guard units 7b of the bearing 7 can fit therein; the guide units 8c arranged in the grooves 8b are spaced evenly at three places with longer projections on the side of the motor rotation shaft 3 in the thrust direction. Fitting the rotation guard units 7b in the grooves prevents the bearing 7 from rotating in the radial direction.

Three small circular projections 8d are formed opposite the stator unit 2 in the guide units 8c. In this embodiment, the guide units 8c contact the ball holding unit 7a to provide its guiding function for the bearing 7.

Figure 4:
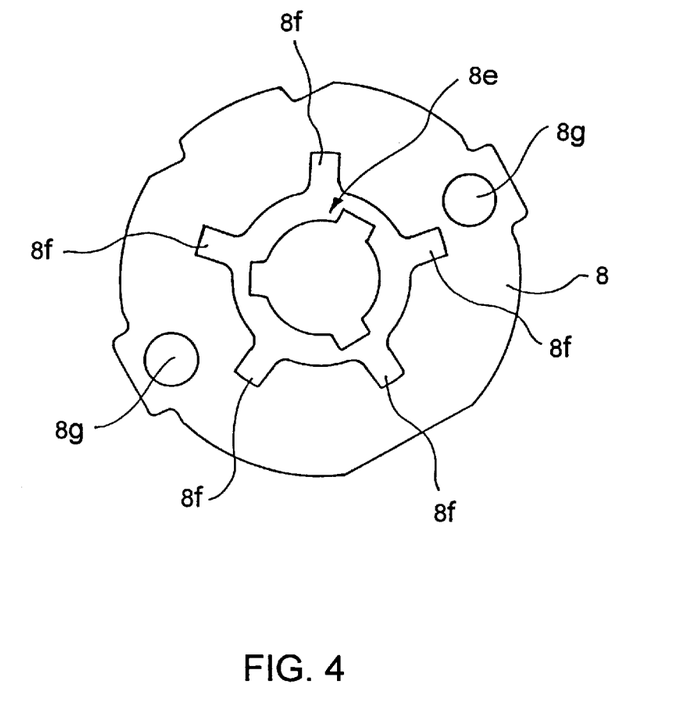
FIG. 4 is a bottom view of the guide plate of the FIG. 3.

The vicinity of the grooves 8b is sloped such that preloaded spring 9a of the plate 9 can contact the ball holding unit 7a. The grooves 8b and the guide units 8c form projecting units 8e in a hexagonal shape on the side opposite the stator unit 2 as illustrated in FIG. 4.

Figure 5:
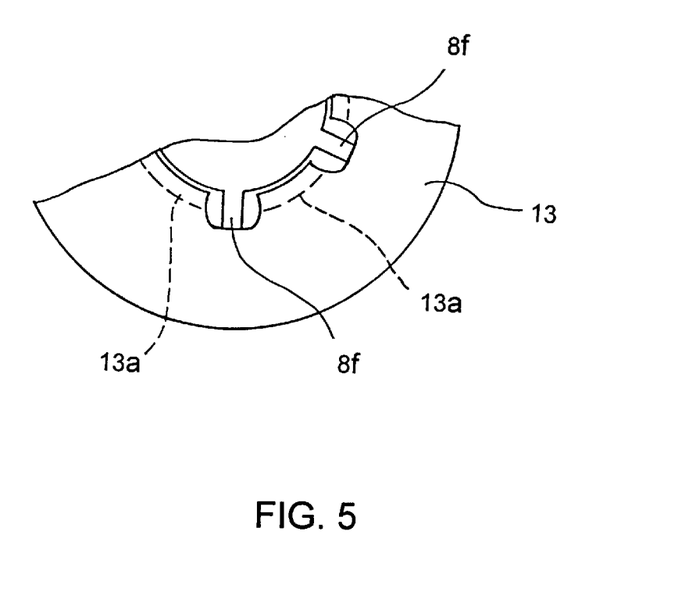
FIG. 5 is a schematics of the major section which describes the relation between the stator unit and a projecting units of the guide plate.

Five positioning units 8f, paced evenly and stretched in the radial direction of the projecting units 8e, fit a fine tooth 13a of the fourth stator 13, as illustrated in FIG. 5, and position the guide plate 8 with respect to the stator unit 2.

Two holes 8g for adjusting the position for installing a motor, and three projections 8h, which ensure the engagement with plate 9, are formed at even spacing on the guide plate 8.

Figure 6:
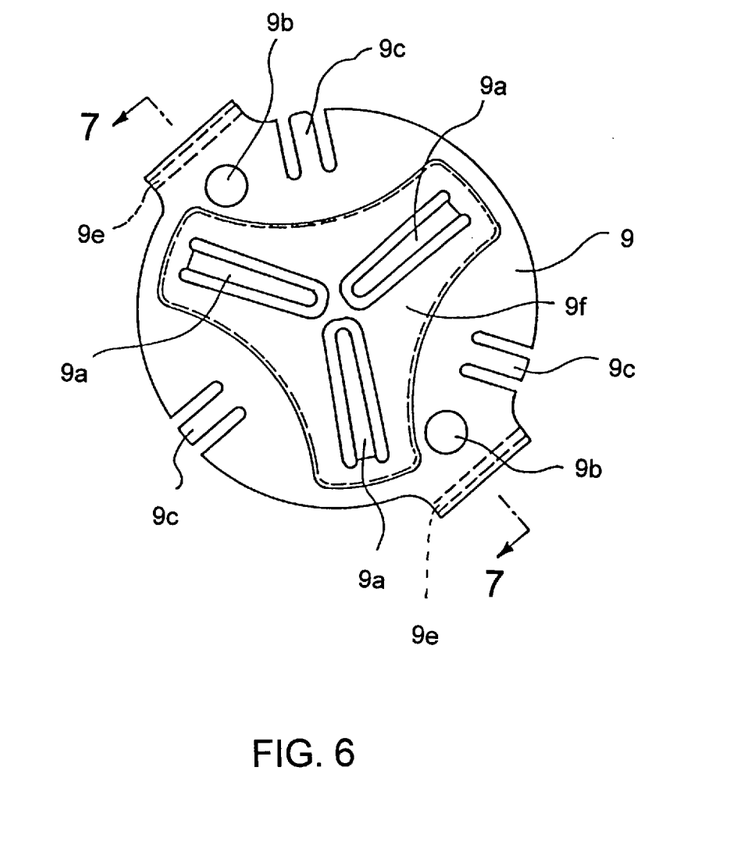
FIG. 6 is a plan view for a plate used in the first embodiment for providing opposing force to the bearings via the spring elements.
Figure 7:
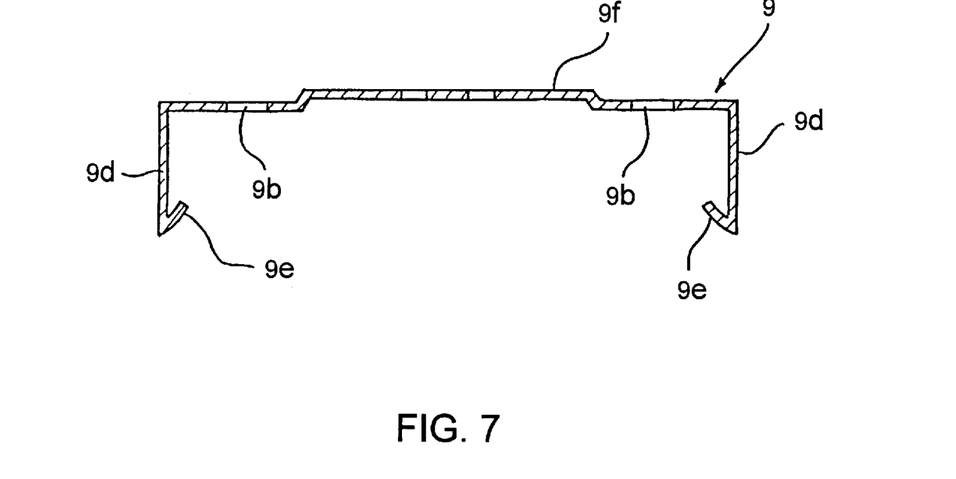
FIG. 7 is a VII—VII cross section of the plate of FIG. 6.
Figure 8:
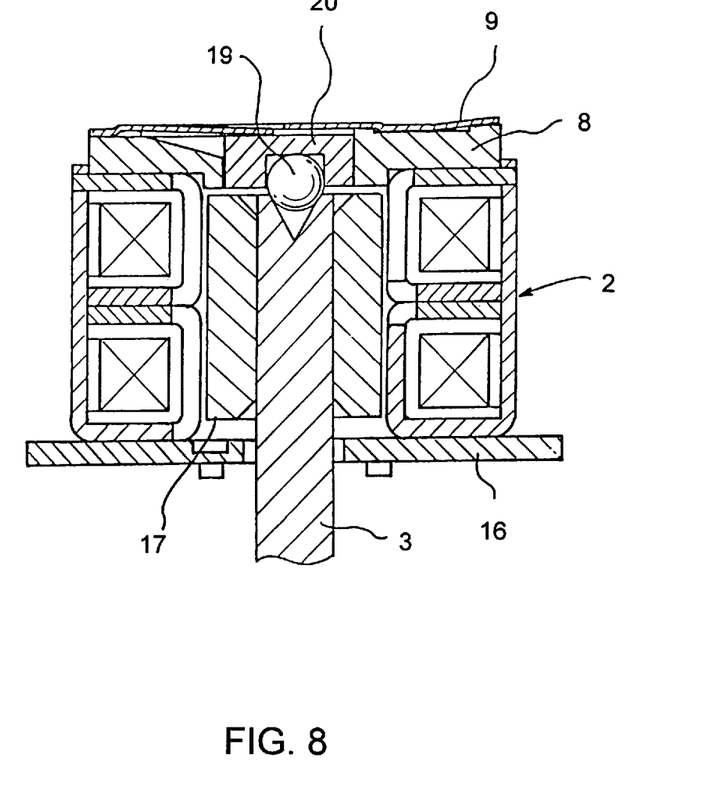
FIG. 8 is a cross section of the major section which describes the status change caused by the movement of the motor rotation shaft of the first embodiment.

The plate 9, arranged outside of the guide plate 8, always works via springs to oppose the force generated by bearing 7 in the thrust direction.

The plate 9 is constructed with three spring elements 9a, two holes 9b, three pressing units 9c, hook units 9e, and two stoppers 9d spaced symmetrically, wherein the three spring elements 9a spaced evenly by 120° contact the bearing 7 and always oppose force of the bearing in the thrust direction; the two holes 9b fit the holes 8g of the guide plate 8 and adjust the positioning for the motor; three pressing units 9c spaced evenly contact the projections 8h of the guide plate 8 and press the guide plate 8 against the stator 2; hook units 9e engaged with pins (not illustrated) of the first stator 10 also work as a housing, and the two stoppers 9d spaced by 180° in symmetry fix plate 9 onto the stator 2.

A convexity 9f which triangularly projects slightly is formed in the center of plate 9 and surrounds the circular projections 8d of the primary guide units 8c.

When assembling plate 9 onto the stator unit 2, the hole 9b of plate 9 is fit the hole 8g of the guide plate, then the hooks 9e are engaged with the pins of the first stator 10.

With this assembly, elements 9a are formed in the position at which they overlap with the grooves 8b in the up and down direction in FIG. 1 Also, with the slope formed in the vicinity of the grooves 8b, the elements 9a function as springs.

When the stepping motor 1 is configured as described above, even if a space is left in a thrust during assembly, the ball holding unit 7a of the bearing 7 may adsorb the space, which is the cause for rattling, as it moves in the thrust direction (illustrated in FIG. 8) while being guided by the guide units 8c of the guide plate 8. In this configuration, the bearing 7 does not move in the radial direction, since it is guided by the guide unit 8c of the guide plate 8.

The operation of the stepping motor 1 configured as such is described herein.

When current flows through coils 14 and 15 of the stator unit 2, the motor rotation shaft 3 which is integral with the rotor magnet 17 rotates due to the mutual magnetic reaction between the stator unit 2 and the rotor magnet 17.

In other words, the lead screw unit 4 formed on the motor rotation shaft 3 rotates and moves the object (not illustrated) to be fed, which is engaged with the lead screw, in the thrust direction.

The amount the object to be fed moves is set by controlling the current flowing through the coils 14 and 15.

As described above, when moving an object to be fed, in the conventional stepping motor 30 illustrated in FIG. 17, rattling or sliding loss could have been generated by the metallic bearing 35. However, the stepping motor 1 of this invention does not have any metallic bearings and the guide unit 8c guides the movement of the bearing 7, therefore, there is no chance for the motor rotation shaft 3 to contact the mounting plate 16.

For this reason, neither rattling or sliding loss occurs outside the two thrust bearings 5 and 6.

Also, because elements 9b of plate 9 are spaced evenly by 120° at three places, the force from bearing 7 can be well opposed and balanced in the thrust direction.

Moreover, in the above embodiment, the gap L between the outer surface of the motor rotation shaft 3 and the inner peripherals 16b of mounting plate 16 is set to be larger than the coaxiality error between the thrust bearing 6 and the motor rotation shaft 3. Therefore, there is no chance that the motor rotation shaft 3 contacts the mounting plate 16.

Furthermore, positioning units 8f of the guide plate 8 fit a fine tooth 13a of the fourth stator 13, and position the guide plate 8 with respect to the stator unit 2. Therefore, the first thrust bearing 6 can improve its coaxiality with respect to the stator unit 2.

In this way, the motor rotation shaft 3 and the stator unit 2 can improve their mutual coaxiality, as a result, the gap between the rotor magnet 17 and the stator unit 2 can be precise.

Also, in the above embodiment, the guide units 8c are longer in the thrust direction and the bearing 7 can be guided with a high precision in the shaft direction. Moreover, the guide plate 8 can be installed on the stator unit 2 only by hooking on the hooks 9e onto plate 9, providing an extremely easy assembly.

Furthermore, this embodiment provides advantages in stability and miniaturization because the slide bearing is employed as a thrust bearing, and the guide plate 8 and the like can be installed on the stator unit 2.

Next, the second embodiment of this invention is described herein referring to FIG. 9 to 13.

Figure 9:
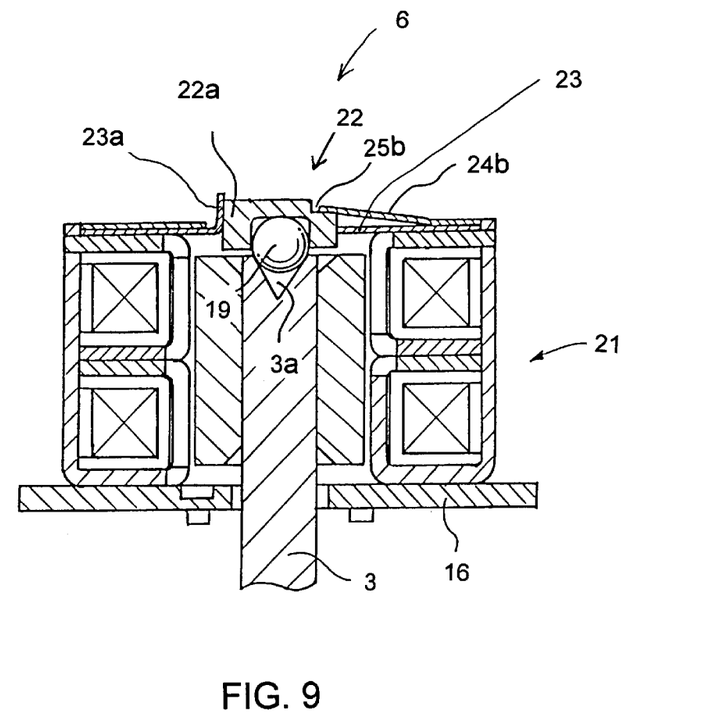
FIG. 9 is a cross section of the major section of the second embodiment.

The stepping motor 21 illustrated in FIG. 9 is different from the stepping motor 1 in the first embodiment by the first thrust bearing 6.

Otherwise, its configuration remains the same as the stepping motor 1 as coded the same as before, therefore, detailed description is not attempted here.

The first thrust bearing 6 in the second embodiment comprises a ball 19, a bearing 22 which supports the ball 19, the guide plate 23 which allows and guides the movement of the bearing 22 in the thrust direction, and the plate 24 which functions via a spring, for opposing the force generated by bearing 22 in the thrust direction.

The ball 19 contacts a conic concave 3a formed on top of the motor rotation shaft 3.

The contact surface between the ball 19 and the conic concave 3a is in a curved shape.

In addition, lubricant oil is applied on the contact surface between the ball 19 and the conic concave 3a to reduce resistance.

Figure 10:
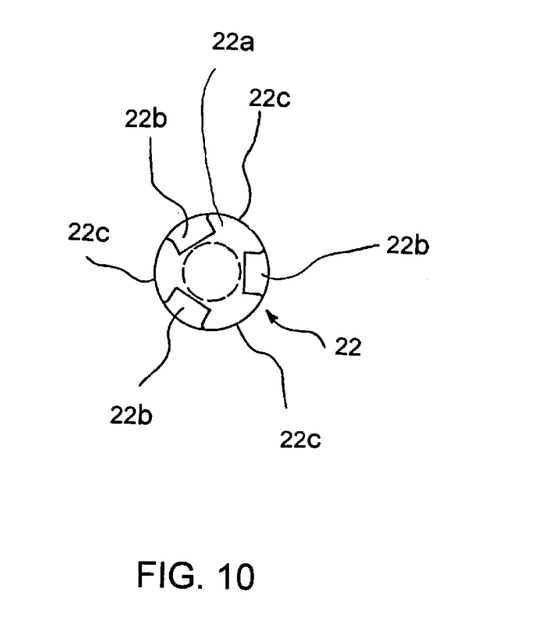
FIG. 10 is a plan view of the ball holding unit used in the second embodiment.

The bearing 22 comprises, as illustrated in FIGS. 9 and 10, a cylindrical ball holding unit 22a which houses the ball 19, engaging concavities 22b which are engaged with a part of plate 24 to prevent the bearing 22 from rotating and which works as a counter measure for rotation of the bearing 22, and units for guiding 22c formed between the engaging concavities 22b and 22b contact the guide plate 23.

In this embodiment, the engaging concavities 22b is spaced evenly at three places.

Figure 11A:
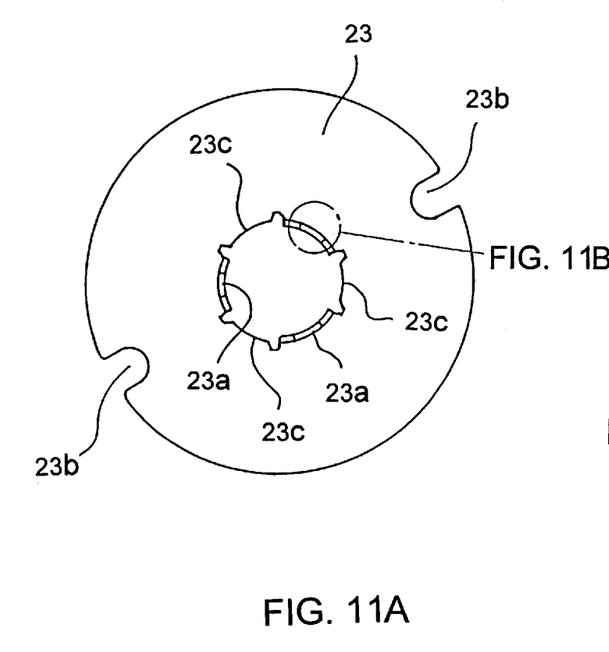
FIG. 11 is a plan view of the guide plate and a side view of the guide unit used in the second embodiment.
Figure 11B:
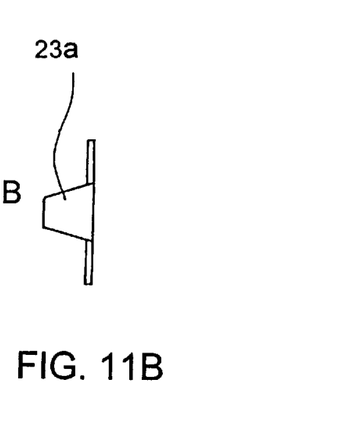

The guide plate 23 which works as a guiding member are made in a circular thin plate, as illustrated in FIGS. 9 and 11, and guide units 23a which allow and guide the movement of the bearing 22 in the thrust direction are formed in its center.

The guide units 23a are formed by bending the above thin plate so that it contacts the unit to be guided 22c of the bearing 22.

Notches 23b, which are positioning sections for guiding the guide plate 23, are formed to fit a part of the stator unit 2 symmetrically spaced by 180°.

Because the guide units 23a are formed by cutting and bending the thin plate, they are shaped such that their bottoms are wide while their tops are narrower, as illustrated in the partial magnified diagram in FIG. 11.

Auxiliary guide units 23c are formed between each of the bent guide units 23a opposite the outer circle of the ball holding unit 22a having a small space therebetween.

Figure 12:
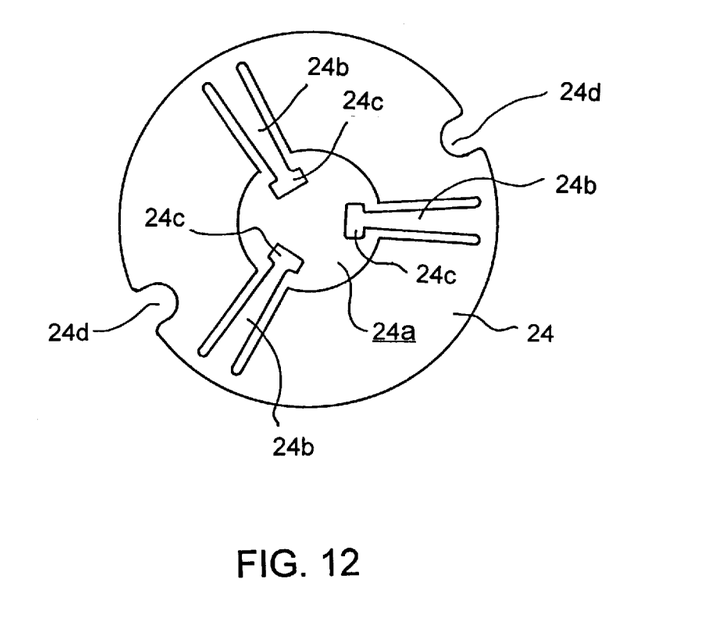
FIG. 12 is a plan view of a plate for providing force to the bearing used in the second embodiment.

The plate 24 is made of a thin plate and a hole 24a is formed to fit the guide units 23a of the guide plate 23 or ball holding unit 22a in the center.

Spring arms 24b are spaced evenly at three places such that it extends from the outer circle side to the hole 24a on the plate 24.

The top of each of the spring arms 24b are the engagement units 24c which are engaged with the engaging concavity 22b of the bearing 22 and enables the opposition of the force from the bearing 22 via a spring, and at the same time, prevent the bearing 22 from rotating in the radial direction.

Notches 24d are formed in symmetry spaced by 180° at two places on the plate 24 for fitting the stator units 2 and positioning the plate 24.

The operation of the stepping motor 21 described above is the same as that of the aforementioned first embodiment, therefore, its details are not described herein.

Figure 13:
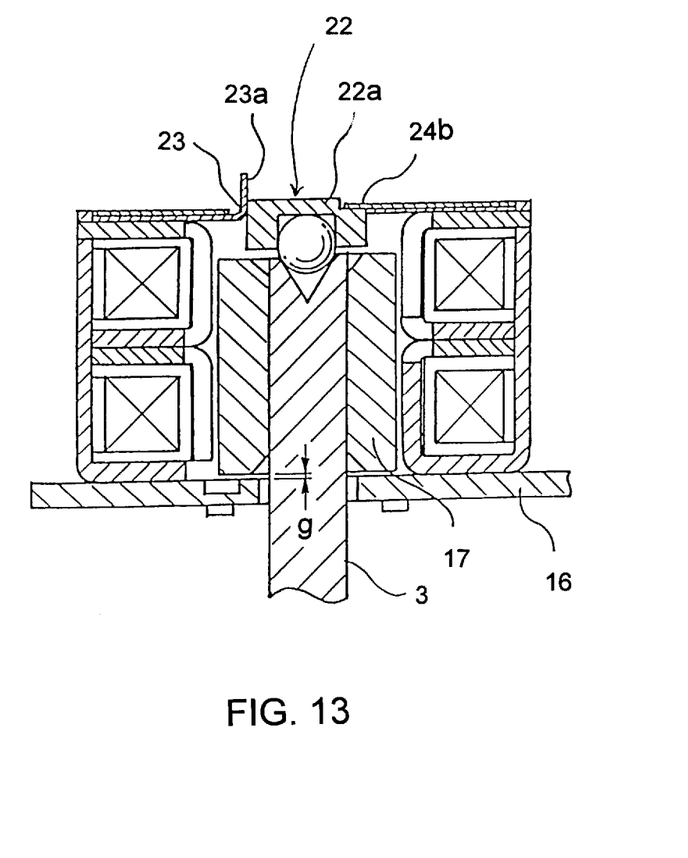
FIG. 13 is a cross section of the major section which describes the status change caused by the movement of the motor rotation shaft of the second embodiment.

FIG. 9 illustrates the status of spring arms 24b being effected by spring to warp while FIG. 13 illustrates the status of the spring arms 24b not being warped.

As illustrated in FIG. 13, when the motor rotation shaft 3 is on the side of the thrust bearing 6 when the spring arms 24b are not warped, a gap g is generated between the rotor magnet 17 and the mounting plate 16. This status is the same as FIG. 8 in the first embodiment.

As described above, no rattling or sliding loss occurs in the second embodiment as they did not in the first embodiment.

In addition, in the second embodiment, the guide plate 23 is formed of a sheet of thin plate, providing an efficient and low cost manufacturing.

Figure 14:
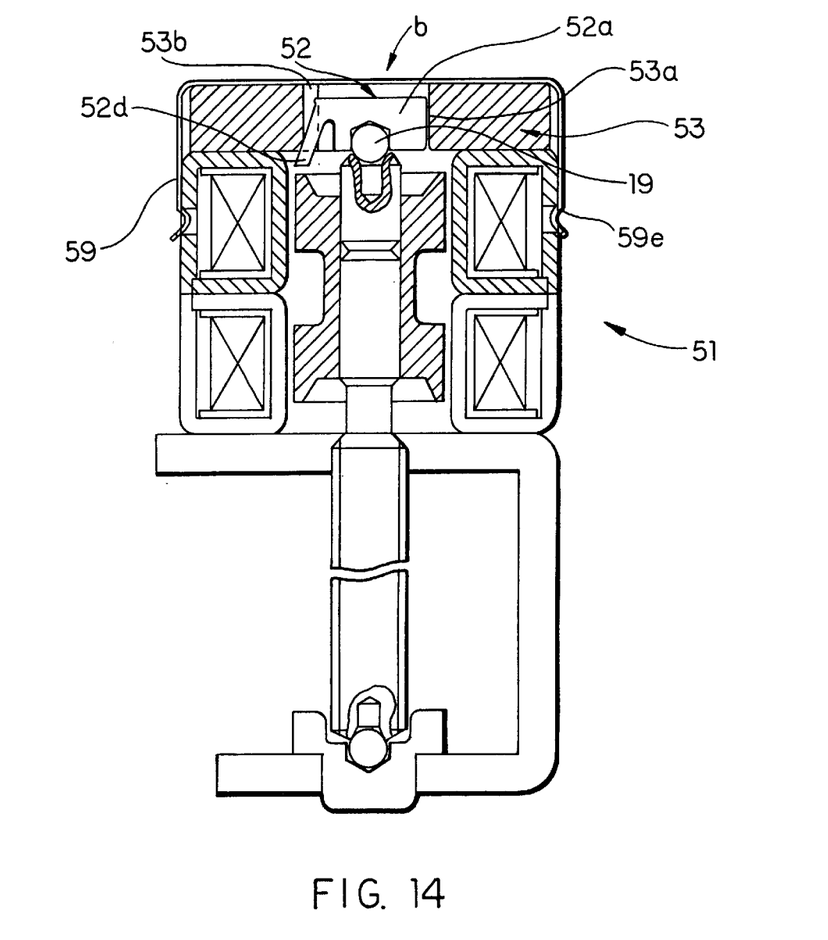
FIG. 14 is a cross section of the major section of the third embodiment.
Figure 15:
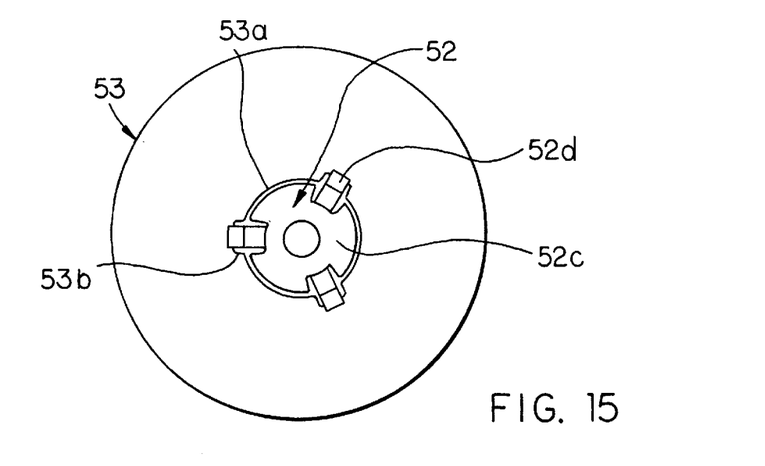
FIG. 15 is a plan view of the ball holding unit and elements for providing opposing force to the bearings used in the third embodiment.

Next, the third embodiment of this invention is described herein referring to FIGS. 14 and 15.

The stepping motor 51 illustrated in FIG. 14 is different from the stepping motor 1 in the first embodiment by the first thrust bearing 6.

More in detail, elements 52d which work to oppose the force in the thrust direction and in the radial direction are integral with bearing 52 using resin as the material of construction.

Otherwise, its configuration remains the same as stepping motor 1 as coded before, therefore, a detailed description is not attempted here.

The first thrust bearing 6 in the third embodiment comprises a ball 19, a bearing 52 which supports the ball 19, the guide plate 53 which allows and guides the movement of the bearing 52 in the thrust direction as a guide member.

The ball 19 contacts a conic concave 3a formed on top of the motor rotation shaft 3.

The contact surface between the ball 19 and the conic concave 3a is in a curved shape.

In addition, lubricant oil is applied on the contact surface between the ball 19 and the conic concave 3a to reduce friction resistance.

The bearing 52 comprises, as illustrated in FIGS. 14 and 15, a cylindrical ball holding unit 52a which houses the ball 19, an element 52d which contacts the guide of a guide plate 53 and slides in the thrust direction and works to oppose the force generated by bearing 52 in the thrust and radial directions via a spring as well, and three circular joints 52c which connect the elements 52d.

Elements 52d are integral with the joint units 52c at the bottom; and takes the shape in which it projects in such a way that it opens in the radial direction as it approaches the side of the motor rotation shaft 3 in FIG. 14 to press in the radial and thrust directions.

In addition, element 52d is longer than the joint 52c on the side of a motor rotation shaft 3.

The guide plate 53 which works as a guide member is formed in a circular plate, as illustrated in FIG. 14, and a circular hole, guide unit 53a, is formed in the center.

The joint 52c of the bearing 52 is inserted in the guide unit 53a keeping some room which allows and guides the movements of the bearing 52 in the shaft direction.

In addition, grooves 53b are spaced evenly and formed at three places on the guide plate 53, which contacts elements 52d of the bearing 52, and, thus, are engaged with the elements 52d projecting in the radial direction.

The grooves 53b prevents the bearing 52 from rotating in the radial direction by being engaged with elements 52d projecting in the radial direction.

That is, the grooves 53b also functions as a rotation counter measure for the bearing 52.

A mounting member 59, which also works as a housing, has hook units 59e, engaged with pins (not illustrated) of the first stator 10, is positioned outside the guide plate 53, as illustrated in FIG. 14, and is installed on the stator unit 51.

The holes and the like for adjusting the installation position for a motor are also formed, but not illustrated, on the bearing 52 which has a ball holding unit 52a, a guide plate 53, and the mounting member 59, in the same manner as in the embodiments described above.

The operation of the stepping motor 51 is the same as the aforementioned first and second embodiments, therefore, detailed descriptions are not attempted first and second embodiments, therefore, detailed descriptions are not attempted here.

As described above, rattling or sliding loss are not generated in the third embodiment as well as the first and second embodiments.

In addition, in the third embodiment, a gap is formed between the joint 52c of the bearing 52 and the grooves 53b of the guide plate 53, therefore, it is possible to increase the freedom between the two, as a result, it improves assemblage.

The structure in which element 52d is formed integral with the bearing 52 using resin prevents element 52d from the possibility of being caught, which may occur in the first and second embodiments when it contacts the ball holding unit.

In addition, in the third embodiment, because element 52d is formed integral with the bearing 52 using resin, its pre-loading force reduces gradually as time passes and since this reduced pre-loading force effects the contact point between the motor rotation shaft 3 and the ball 19, it decreases friction thereon which could have been increased otherwise.

In other words, the lubricant applied around the ball 19 loses its lubriciousness as time passes as well. If the pre-loading force at element 52d is constant, one may encounter the problem that frictional force is increased at the contact point between the motor shaft 3 and the ball 19. However, in the third embodiment, decreasing the pre-loading force decreases friction thereon which would have been increased otherwise.

As described above, no rattling or sliding loss is generated in the third embodiment which is the same as in the first and second embodiment.

Note that each of the embodiments are preferable for this invention. However, these do not limit the applications. A variety of modifications may be made as long as the intention remains within the spirit of this invention. For example, the circular hole which houses balls may take another shape such as semi-spherical or bowl-like shape.

The rotation guard mechanism may not always be necessary. In addition, the elements or spring arms are spaced evenly at three places in the aforementioned embodiment, but can be spaced evenly at two places if they oppose force from the bearing in the thrust direction.

The aforementioned elements or spring arms can be spaced evenly at more than four places.

Figure 16A:
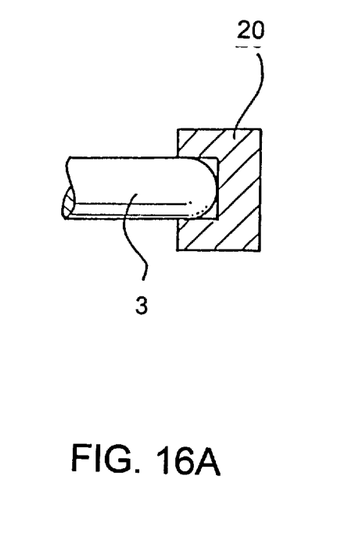
FIG. 16 is a diagram which describes other embodiments of the thrust bearing.
Figure 16B:
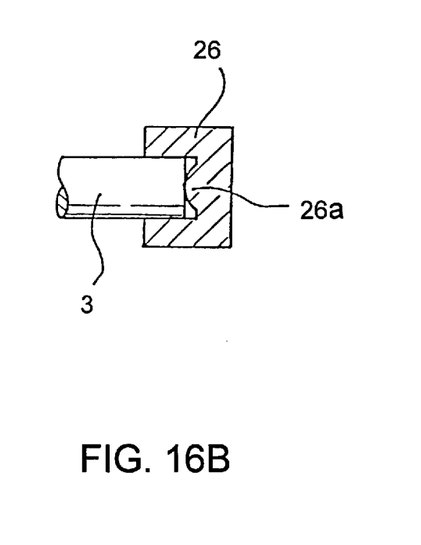

Also, the thrust bearing can eliminate balls, and instead, the tip of the motor rotation shaft 3 may be formed in a semi-spherical shape as illustrated in FIG. 16 (A) or the tip of the ball holding unit 26 which the motor rotation shaft 3 contacts may be formed to be semi-spherical unit 26a as illustrated in FIG. 16 (B).

As described, it is preferable to increase stability for a thrust bearing that one employs one ball, not two be used as an anti-frictional bearing, or that one employs a slide bearing whose contact surface is curved as illustrated in FIGS. 16 (A) and (B). One may also employ other bearing structures used as anti-frictional bearings.

As described above, the stepping motor of this invention does not have any metallic bearings. In addition, the structure guides the bearing in the thrust direction, generating no rattling which is caused by the sliding loss occurred in the motor rotation shaft or the movement of the motor rotation shaft itself.

In addition, the spring elements are spaced evenly at a plurality of places around the motor rotation shaft; the motor rotation shaft balances and opposes the force in the thrust direction via the bearing.

While the foregoing description and drawings represent the preferred embodiments of the present invention, it will be obvious to those skilled in the art that various changes and modifications may be made therein without departing from the true spirit and scope of the present invention.

What is claimed is:

1. A motor comprising:

a motor rotation shaft;

a stator for housing said motor rotation shaft;

a first thrust bearing which supports one end of said motor rotation shaft and a second thrust bearing which supports the other end of said motor rotation shaft to control positioning in a thrust direction of said motor rotation shaft;

said first thrust bearing further comprising:

a bearing for supporting one end of said motor rotation shaft and being movable in a shaft direction of said motor rotation shaft;

a guide member which includes a guide hole for guiding the movement of said bearing in said shaft direction; and a plurality of pre-loaded elements for contacting the bearing and opposing a force generated by the bearing in the shaft direction, said elements being evenly spaced around said motor shaft;

wherein said bearing further includes rotation guard units and said guide member includes grooves with which said rotation guard units are engaged for preventing said bearing from rotating, and each said element is arranged on said grooves of said guide member and said grooves maintain a sloped surface to allow said element to load-contact said bearing.

2. The motor according to claim 1, wherein said elements are spaced apart by 120° at three places.

3. The motor according to claim 1, wherein said elements contact said bearing opposite the bearing surface of said motor rotation shaft to oppose the force generated by said bearing.

4. The motor according to claim 1, wherein said guide member has positioning units for positioning the guide member with respect to a stator unit of the motor.

5. The motor according to claim 1, wherein said elements are formed integral with said bearing.

6. The motor according to claim 3, wherein each said element is a spring.

7. The motor according to claim 6, wherein said spring extends from a plate.

8. The motor according to claim 1, wherein a top of each said element has an engagement unit and said engagement unit is engaged with said rotation guard units of said bearing.

9. The motor according to claim 11, further comprising a guide plate including a guide unit which is a thin plate formed by cutting and bending for guiding said bearing.

10. A motor comprising:

a motor rotation shaft;

a stator for housing said motor rotation shaft;

a first thrust bearing which supports one end of said motor rotation shaft and a second thrust bearing which supports the other end of said motor rotation shaft to control positioning in a thrust direction of said motor rotation shaft;

said first thrust bearing further comprising:

a bearing for supporting one end of said motor rotation shaft and being movable in a shaft direction of said motor rotation shaft;

a guide member which includes a guide hole for guiding the movement of said bearing in said shaft direction; and a plurality of pre-loaded elements for contacting the bearing and opposing a force generated by the bearing in the shaft direction, said elements being evenly spaced around said motor shaft;

wherein (i) said elements are formed integral with said bearing, and (ii) said bearing includes plurality of elements and said guide member includes a plurality of grooves which contact the elements and prevent the bearing from rotating.

11. A motor comprising:

a motor rotation shaft;

a stator for housing said motor rotation shaft;

a first thrust bearing which supports one end of said motor rotation shaft and a second thrust bearing which supports the other end of said motor rotation shaft to control positioning in a thrust direction of said motor rotation shaft;

said first thrust bearing further comprising:

a bearing for supporting one end of said motor rotation shaft and being movable in a shaft direction of said motor rotation shaft;

a guide member which includes a guide hole for guiding the movement of said bearing in said shaft direction;

a plurality of pre-loaded elements for contacting the bearing and opposing a force generated by the bearing in the shaft direction, said elements being evenly spaced around said motor shaft;

a guide plate including a guide unit which is a thin plate formed by cutting and bending for guiding said bearing; and wherein (i) each said plurality of elements has an engagement unit and said bearing has a plurality of engaging concavities such that said engagement units are engaged with said engaging concavities of said bearing to prevent the bearing from rotating, (ii) said elements contact said bearing opposite the bearing surface of said motor rotation shaft to oppose the force generated by said bearing, (iii) wherein each said element is a spring which extends from a plate.

12. The motor according to claim 11, wherein said elements are spaced apart by 120° at three places.

13. The motor according to claim 11, wherein said guide member has positioning units for positioning the guide member with respect to a stator unit of the motor.

* * * * *